(12) United States Patent
Okugawa et al.

(10) Patent No.: US 7,271,953 B2
(45) Date of Patent: Sep. 18, 2007

(54) CONFOCAL MICROSCOPE

(75) Inventors: Hisashi Okugawa, Yokosuka (JP);
Naoshi Aikawa, Fujisawa (JP)

(73) Assignee: Nikon Corporation, Tokyo (JP)

( * ) Notice: Subject to any disclaimer, the term of this patent is extended or adjusted under 35 U.S.C. 154(b) by 107 days.

(21) Appl. No.: 11/081,731

(22) Filed: Mar. 17, 2005

(65) Prior Publication Data
US 2005/0213206 A1 Sep. 29, 2005

(30) Foreign Application Priority Data
Mar. 22, 2004 (JP) ............................. 2004-083319

(51) Int. Cl.
*G02B 21/06* (2006.01)
*G02B 21/00* (2006.01)
(52) U.S. Cl. ...................... 359/388; 359/368
(58) Field of Classification Search ............... 359/368, 359/385, 388, 389; 250/237
See application file for complete search history.

(56) References Cited

U.S. PATENT DOCUMENTS

| 5,886,784 A | 3/1999 | Engelhardt | 356/326 |
|---|---|---|---|
| 5,932,871 A | 8/1999 | Nakagawa et al. | 250/201.3 |
| 6,028,306 A * | 2/2000 | Hayashi | 250/235 |
| 6,150,666 A | 11/2000 | Engelhardt et al. | 250/559.22 |
| 6,423,960 B1 * | 7/2002 | Engelhardt et al. | 250/214 R |
| 6,555,811 B1 * | 4/2003 | Amos | 250/234 |
| 6,852,967 B2 * | 2/2005 | Engelhardt et al. | 250/226 |

FOREIGN PATENT DOCUMENTS

| DE | 43 30 347 | 3/1995 |
|---|---|---|
| GB | 2 344 014 | 5/2000 |
| JP | UM 6-16927 | 3/1994 |

* cited by examiner

*Primary Examiner*—Alessandro Amari
(74) *Attorney, Agent, or Firm*—Miles & Stockbridge PC

(57) ABSTRACT

A confocal microscope includes a light source that emits illuminating light beam, an illuminating optical system that irradiates the illuminating light beam onto a specimen, a condensing optical system that condenses the light reflected off the specimen and a light detection unit. The light detection unit includes a mask member, a movable shutter and a light detector. The mask member includes a plurality of reflecting/transmitting surfaces each constituting a light separating surface, and only the central portion of the light flux entering the mask member from the condensing optical system exits through a pinhole. The movable shutter opens or closes off a plurality of pinholes individually, and the light detector detects the light flux having passed through the pinholes.

13 Claims, 12 Drawing Sheets

CONFOCAL MICROSCOPE

INCORPORATION BY REFERENCE

The disclosure of the following priority application is herein incorporated by reference:
Japanese Patent Application No. 2004-083319 filed Mar. 22, 2004

BACKGROUND OF THE INVENTION

1. Field of the Invention

The present invention relates to a confocal microscope.

2. Description of Related Art

Japanese Laid Open Utility Model Publication No. H6-16927 discloses a confocal microscope in which the quantity of the light flux having passed through a confocal aperture is detected with a light detector by condensing illuminating light on a specimen such as an organic specimen and condensing onto the confocal aperture surface the light flux from the light converging area on the specimen. With this confocal microscope, the light quantity is detected while scanning the specimen with the light converging area (spot) in order to obtain a two-dimensional image of the specimen.

A pinhole member is disposed on the confocal aperture surface. The pinhole member allows only the light beam condensed inside a pinhole (opening) to be transmitted and cuts off the rest of the light. For this reason, only the light beam from a position at a specific height in the specimen enters the light detector and the light beams from positions with other heights do not enter the light detector. Thus, the confocal microscope makes it possible to observe only the image of a thin layer of the specimen located at a specific height in the specimen (sectioning).

In order to alter the thickness of the layer to be observed, i.e., in order to alter the sectioning resolution, the diameter of the opening at the pinhole member is adjusted. The sectioning resolution is lowered by increasing the opening diameter, whereas the sectioning resolution is raised by reducing the opening diameter.

The microscope disclosed in Japanese Laid Open Utility Model Publication No. H6-16927 includes a mechanism for controlling the pinhole diameter (opening diameter) of the pinhole member or a mechanism for selectively inserting/withdrawing one of a plurality of pinhole members having different pinhole diameters into/out of the optical path, so as to allow the user to freely adjust the sectioning resolution in correspondence to the specific type of specimen being observed.

However, a confocal microscope having a mechanism for controlling the pinhole diameter is bound to be large and costly, whereas the mechanism for allowing one of a plurality of pinhole members to be inserted into or withdrawn from the optical path is bound to complicate the process of positioning the pinhole in the optical path.

SUMMARY OF THE INVENTION

A confocal microscope according to the present invention includes a light source that emits illuminating light beam, an illuminating optical system that irradiates the illuminating light beam onto a specimen, a condensing optical system that condenses light from the specimen, and a detection unit that detects the light from the specimen entering at a position at which the light passing through the condensing optical system is condensed. The detection unit detects a central light and a peripheral light around the central light at a position substantially optically conjugate with a position on the specimen at which the illuminating light beam is condensed. In other words, the detection unit detects the central light and the peripheral light around the central light of the light from the specimen having been condensed through the condensing optical system and entering at a position substantially optically conjugate with a position on the specimen at which the illuminating light beam is condensed. A light separating member that is disposed in the vicinity of a focal plane of the condensing optical system and separates the light from the specimen may be further provided, with the detection unit detecting the lights separated at the light separating member, and it is preferable that the light separating member includes a light separating surface disposed within a focal depth of the condensing optical system and tilted relative to an optical axis of the condensing optical system, that separates the light from the specimen entering at a position substantially optically conjugate with a position on the specimen at which the illuminating light beam is condensed into a central light and a peripheral light around the central light, and that the detection unit detects the central light and the peripheral light having been separated from each other at the light separating surface.

It is desirable that the light separating member has a plurality of light separating surfaces. The light separating surface may include a circular transmitting surface through which the central light is transmitted and a reflecting surface at which the peripheral light is reflected. It is preferable that the light separating member includes a plurality of light separating surfaces disposed in series on a reflected light path of the peripheral light, and among the plurality of the light separating surfaces, a diameter of the transmitting surface of the light separating surface disposed further with regard to a direction in which the reflected light path progresses is greater.

The light separating surface may include a circular reflecting surface at which the central light is reflected and a transmitting surface through which the peripheral light is transmitted. It is preferable that the light separating member has a plurality of light separating surfaces disposed in series on a transmitted light path of the peripheral light, and among the plurality of the light separating surfaces, a diameter of the reflecting surface of the light separating surface disposed further with regard to a direction in which the transmitted light path progresses is greater.

The detection unit may includes a plurality of light detectors. It is desirable that the detection unit has a first detector that detects one of the central light and the peripheral light having been separated at the light separating surface and a second detector that detects the other light not detected at the first detector.

It is desirable that the detection unit has a single detector that detects both the central light and the peripheral light having been separated at the light separating surface and a movable shutter that blocks/admits one of the central light and the peripheral light, and that the light separating member guides the central light and the peripheral light to the single detector. The detection unit may detect a quantity of a sum of the central light and the peripheral light or a quantity of the central light.

A confocal microscope system according to the present invention includes a confocal microscope, and a selecting/adding unit that selects at least one signal to be added together among detection signals provided from the plurality of light detectors.

A confocal microscope system according to another aspect of the present invention includes a confocal microscope, a storage unit that individually stores in memory signals detected at the plurality of light detectors, and a calculation operation unit that executes arithmetic operation on the signals stored in the storage unit.

DESCRIPTION OF PREFERRED EMBODIMENTS

The following is an explanation of the embodiments of the present invention, given in reference to the drawings.

First Embodiment

In reference to FIGS. 1 through 5, the confocal microscope achieved in the first embodiment of the present invention is explained. The explanation is given on an example in which the present invention is adopted in a fluorescence confocal microscope system.

Figure 1:
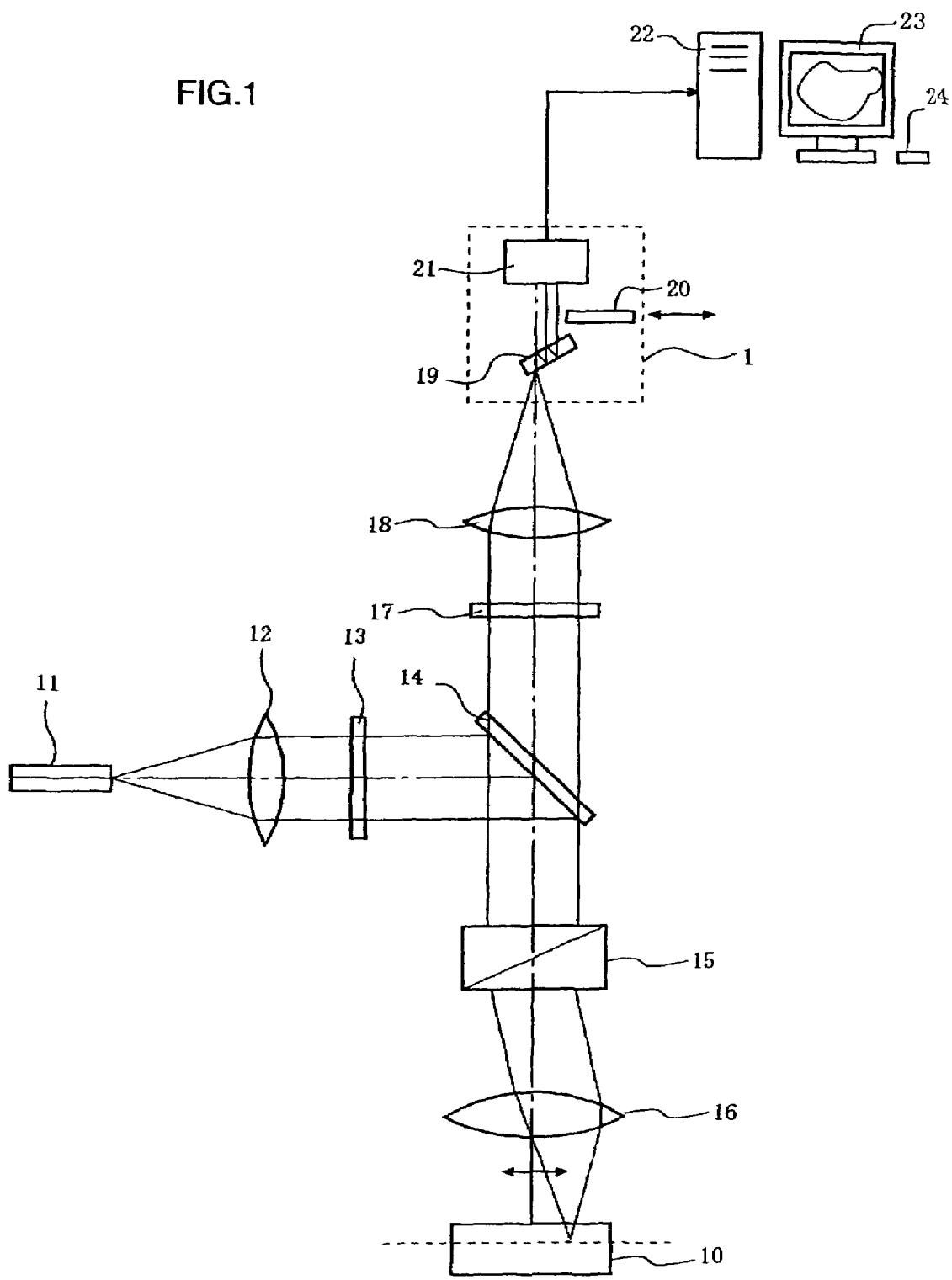
FIG. 1 shows the structure of a fluorescence confocal microscope system achieved in a first embodiment.

The fluorescence confocal microscope system achieved in the first embodiment includes a light source 11, an illumination lens 12, a filter 13, a dichroic mirror 14, a galvano-mirror 15, an objective lens 16, a filter 17, a condenser lens 18, a mask member 19, which is a light separating member, a movable shutter 20, a light detector 21, a computer 22, a monitor 23, an input device 24 and the like, as shown in FIG. 1. A specimen 10 which is processed in advance for fluorescence observation is placed in the fluorescence confocal microscope system.

It is to be noted that a light detection unit 1 is an optical system constituted with the mask member 19, the movable shutter 20 and the light detector 21. The illumination lens 12 and the objective lens 16 constitute an illuminating optical system that illuminates the specimen 10 with illuminating light. The objective lens 16 and the condenser lens 18 constitute a condensing optical system that condenses light from the specimen 10.

Light beam emitted from the light source 11 is condensed onto the specimen 10 via the illumination lens 12, the filter 13, the dichroic mirror 14, the galvano-mirror 15 and the objective lens 16 and forms a light converging area (spot) on the specimen 10. From the area on the specimen 10 over which the spot is formed, light (fluorescent light) is emitted.

The light flux from the specimen 10 returns to the objective lens 16 and then enters the dichroic mirror 14 via the objective lens 16 and the galvano-mirror 15.

The light flux having entered the dichroic mirror 14 is transmitted through the dichroic mirror 14, i.e., departs along a direction different from the direction in which the filter 13 and the illumination lens 12 are disposed, and enters the mask member 19 via the filter 17 and the condenser lens 18.

Figure 2A:
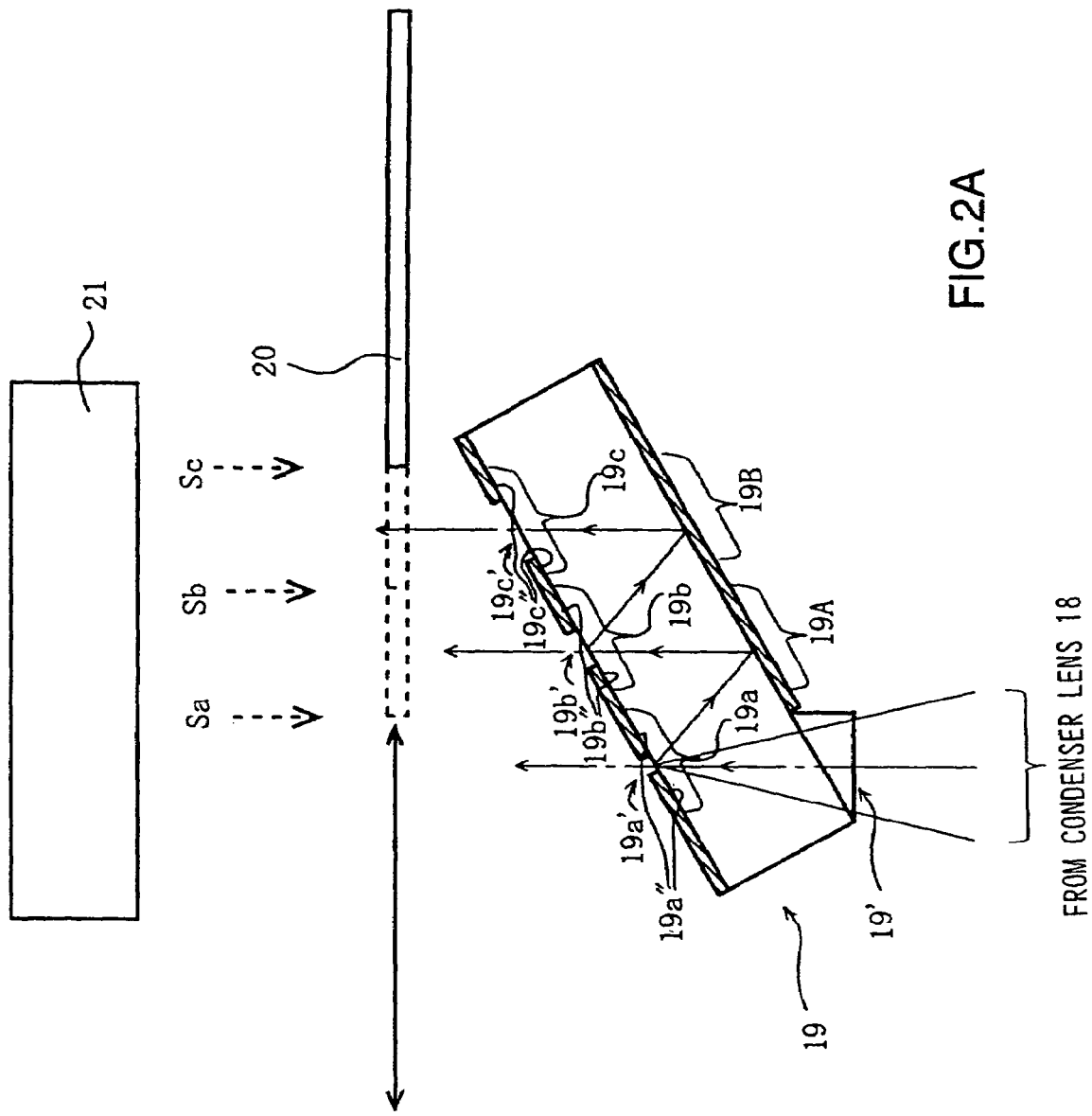
FIGS. 2A and 2B illustrate a light detection unit used in the first embodiment.

As shown in FIG. 2A, the mask member 19 includes pinholes $19a'$, $19b'$, $19c'$ and the like disposed at positions substantially optically conjugate with the spot forming area on the specimen 10. These pinholes $19a'$, $19b'$ and $19c'$ function as transmitting surfaces through which a light flux is transmitted. The mask member 19 is to be described in detail later.

The light flux having entered the mask member 19 is condensed in the vicinity of the pinholes $19a'$, $19b'$ and $19c'$ and is emitted to the outside of the mask member 19 through the pinholes $19a'$, $19b'$ and $19c'$.

The light flux having passed through the pinholes $19a'$, $19b'$, $19c'$ enters the light detector 21 via the movable shutter 20.

The light detector 21 outputs a signal indicating a level corresponding to the quantity of light flux having entered therein. This signal is then taken into the computer 22.

The galvano-mirror 15 is driven by a motor (not shown). As it is driven with the motor, the spot two-dimensionally scans the specimen 10. The computer 22 takes in the signal output from the light detector 21 during this scanning operation.

Based upon the signal provided by the light detector 21, the computer 22 builds up image data of a two-dimensional image of the specimen 10 and displays the two-dimensional image on the monitor 23.

Figure 2B:
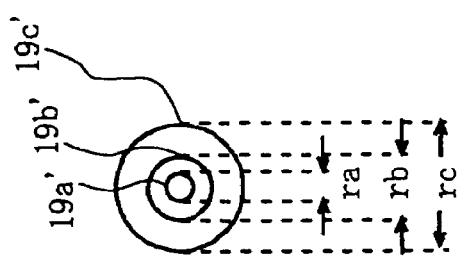
Figure 3:
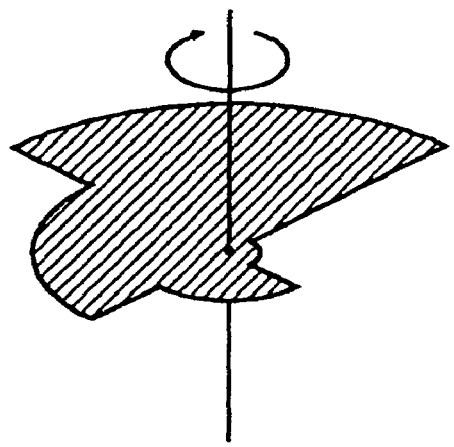
FIGS. 3A to 3C each present an example of a light shielding unit that may be used in a movable shutter.
Figure 3:
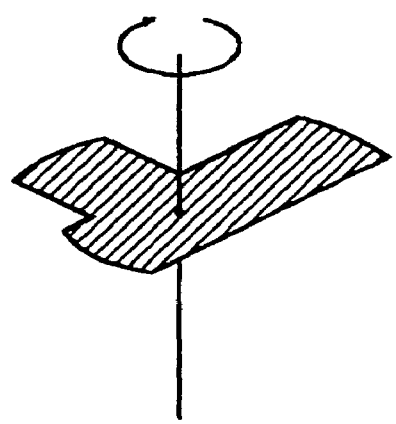
Figure 3:
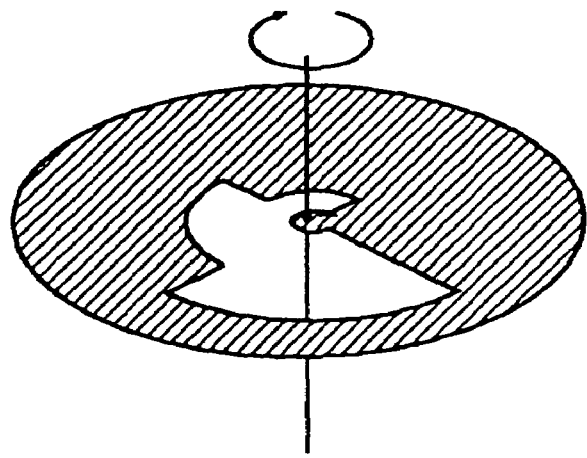

Now, the various elements constituting the light detection unit 1 in the fluorescence confocal microscope system explained above are described in detail in reference to FIGS. 2A and 2B.

As shown in FIG. 2A, the mask member 19 includes a reflecting/transmitting surface $19a$, which is a light separating surface that is tilted relative to a plane at a substantial center within the focal depth of the condenser lens 18 (see FIG. 1).

The reflecting/transmitting surface $19a$ is constituted with a transmitting surface (pinhole) $19a'$ assuming the shape of a very small circle around the optical axis of the condenser lens 18 and a reflecting surface $19a''$ covering the area surrounding the pinhole $19a'$. The diameter ra (see FIG. 2B) of the pinhole $19a'$ is equivalent to the diameter of the spot (light converging area) formed on the specimen 10.

Namely, the diameter ra of the pinhole $19a'$ corresponds to the diameter of the Airy disk of the light spot formed in the vicinity of the light converging surface of the condenser lens 18, which is determined by the objective lens 16 and the condenser lens 18. Accordingly, the diameter ra may be expressed in approximation, as expressed below in (expression 1) with λ representing the wavelength of the light from the light source 11, NA representing the numerical aperture of the objective lens 16 and M representing the total magnification factor achieved with the objective lens 16 and the condenser lens 18.

$$ra = 1.2 \times M \times \lambda / NA \quad \text{(expression 1)}$$

Only the central light portion of the light flux having entered the mask member 19 from the condenser lens 18, which has entered at the position where the pinhole 19a' is formed, exits the mask member 19 through the pinhole 19a'. The peripheral light flux other than the central portion of the light flux is reflected at the reflecting surface 19a" along a direction offset from the direction towards the condenser lens 18.

At the mask member 19, a reflecting surface 19A that further reflects the light flux having been reflected at the reflecting surface 19a" is disposed parallel to the transmitting/reflecting surface 19a.

In addition, a reflecting/transmitting surface 19b for receiving the light flux reflected at the reflecting surface 19A, which is disposed on the optical axis of light beam reflected off the reflecting/transmitting surface 19a is formed at the mask member 19.

The reflecting/transmitting surface 19b includes the pinhole 19b' disposed near the center of the light flux reflected at the reflecting surface 19A and a reflecting surface 19b" covering the area surrounding the pinhole 19b'. The diameter rb (see FIG. 2B) of the pinhole 19b' is greater than the diameter ra of the pinhole 19a' so as to achieve a relationship expressed as, for instance, rb=2ra.

At the mask member 19, only the central light portion of the light flux having been reflected at the reflecting surface 19A, which has entered at the position where the pinhole 19b' is formed, exits the mask member 19 through the pinhole 19b'. The peripheral light flux other than the central portion of the light flux is reflected at the reflecting surface 19b" along a direction deviating from the reflecting surface 19A.

At the mask member 19, a reflecting surface 19B that further reflects the light flux having been reflected at the reflecting surface 19b" is disposed on the plane on which the reflecting surface 19A is disposed.

The reflecting surface 19B and the reflecting surface 19A described earlier guide the central light flux and the peripheral light flux having been separated at the reflecting/transmitting surfaces 19a and 19b to the detection surface of the light detector 21, which is to be detailed later.

In addition, a reflecting/transmitting surface 19c for receiving the light flux reflected at the reflecting surface 19B, which is disposed on the optical axis of light beam reflected off the reflecting/transmitting surface 19b is formed at the mask member 19.

The reflecting/transmitting surface 19c includes the pinhole 19c' disposed near the center of the light flux reflected at the reflecting surface 19B and a reflecting surface 19c" covering the area surrounding the pinhole 19c'. The diameter rc (see FIG. 2B) of the pinhole 19c' is greater than the diameter rb of the pinhole 19b' so as to achieve a relationship expressed as, for instance, rc=2rb.

At the mask member 19, only the central light portion of the light flux having been reflected at the reflecting surface 19B, which has entered at the position where the pinhole 19c' is formed, exits the mask member 19 through the pinhole 19c'.

It is to be noted that the distance between the reflecting/transmitting surface 19a and the reflecting surface 19A, the distance between the reflecting surface 19A and the reflecting/transmitting surface 19b, the distance between the reflecting/transmitting surface 19b and the reflecting surface 19B and the distance between the reflecting surface 19B and the reflecting/transmitting surface 19c are all set small enough so as to ensure that the reflecting/transmitting surface 19b and the reflecting/transmitting surface 19c are positioned within the focal depth of the condenser lens 18.

It is also to be noted that the lengths of the optical paths along the optical axis extending from the reflecting/transmitting surface 19a to the reflecting/transmitting surface 19b and the reflecting/transmitting surface 19c are set within the focal depth df of the condenser lens 18. The focal depth df is expressed as in (expression 2) with λ representing the wavelength of the light from the light source 11, NA representing the numerical aperture of the objective lens 16 and M representing the total magnification factor achieved with the objective lens 16 and the condenser lens 18.

$$df = M^2 \times \lambda / NA^2 \quad \text{(expression 2)}$$

The mask member 19 assuming the structure described above may be formed through the following process, for instance.

A transparent substrate achieving transparency with regard to at least the fluorescent light from the specimen 10, e.g., an optical glass substrate, is prepared. On one surface of the transparent substrate, an optical film having a property for reflecting the light from the specimen 10, such as a chrome film, is formed over areas at which the reflecting surfaces 19a", 19b" and 19c" are to be formed. Then, an optical film having a similar property is formed over areas at which the reflecting surfaces 19A and 19B are to be formed on the other surface of the transparent substrate.

It is to be noted that the reflecting surfaces 19a", 19b" and 19c" may be formed so that they lie either partially or fully continuous to each other. In addition, the reflecting surface 19A and the reflecting surface 19B may be formed continuous to each other, as well.

It is desirable that a transparent member 19' assuming a wedge shape, as shown in FIG. 2A, be bonded onto the area of the transparent substrate where the light flux initially enters in order to prevent the generation of any superfluous reflected light by setting the angle of incidence of the initial light flux close to 0. It is desirable that the transparent member 19' be constituted by using the same material as that constituting the transparent substrate or a material having a refractive index substantially equal to the refractive index of the material constituting the transparent substrate. It is also desirable that a reflection reducing film of the known art or the like be formed over the various areas of the transparent substrate as needed, so as to prevent occurrence of stray light.

The detection surface at the light detector 21 has a large enough area to fully cover the optical path of the light flux from the pinhole 19a', the optical path of the light flux from the pinhole 19b' and the optical path of the light flux from the pinhole 19c' at the mask member 19 described above.

The movable shutter 20, which is driven in steps as indicated with the dotted line in FIG. 2A, may be set to at least one of the following three states Sa, Sb and Sc in correspondence to the extent to which it is driven.

In the first state Sa, the optical path of the light flux from the pinhole 19a' is open, with the optical paths of the light fluxes from the pinholes 19b' and 19c' closed.

In the second state Sb, the optical paths of the light fluxes from the pinholes 19a' and 19b' are open, with the optical path of the light flux from the pinhole 19c' closed.

In the third state Sc, the optical paths of the light fluxes from the pinholes 19a', 19b' and 19c' are all open, as indicated by the solid line in FIG. 2A.

The light shielding unit at such a movable shutter 20 may be achieved by adopting any of various forms. If a rotating mechanism is adopted as the drive mechanism of the movable shutter 20, any of the blade-shaped members shown in FIGS. 3A, 3B and 3C, for instance, with the length along the radial direction changing stepwise, may be used. As the light shielding unit shown in FIGS. 3A, 3B or 3C is rotated, the movable shutter 20 enters the state Sa, Sb or Sc described above.

In addition, the movable shutter 20 may be driven either manually or electrically. The movable shutter 20 may be electrically driven by mounting a motor such as a stepping motor at the drive mechanism for the movable shutter 20. In this case, the motor should be electrically connected with a user interface. If the input device 24 in FIG. 1 is used as the user interface, for instance, the motor at the drive mechanism for the movable shutter 20 should be electrically connected with the computer 22.

Figure 4:
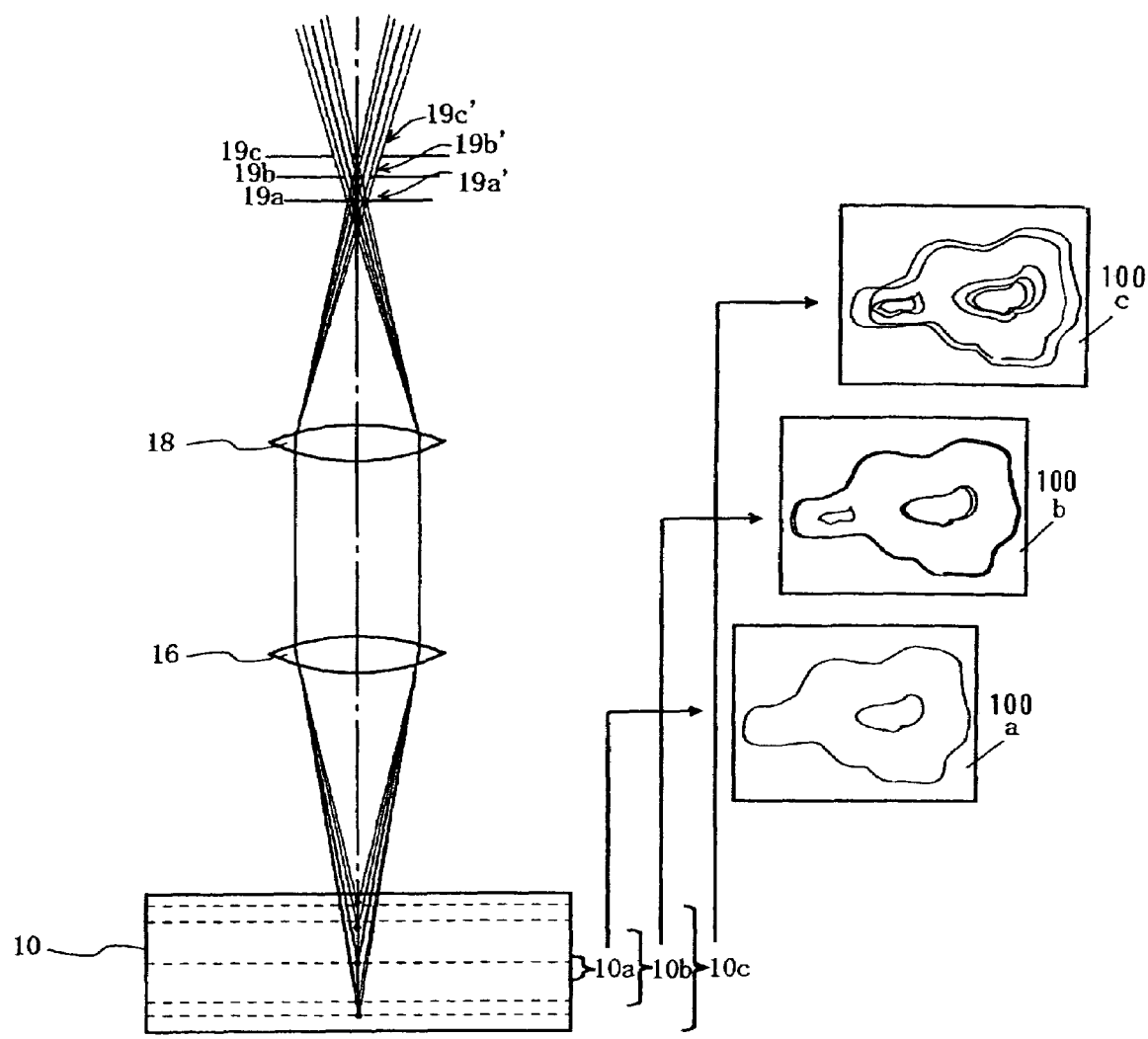
FIG. 4 schematically illustrates the relationship between reflecting/transmitting surfaces at a mask member and the individual layers of the specimen.

Next, the operation of the fluorescence confocal microscope system achieved in the first embodiment is explained in reference to FIG. 4. It is to be noted that FIG. 4 schematically illustrates the relationship between the individual reflecting/transmitting surfaces 19a, 19b and 19c of the mask member 19 and various layers 10a, 10b and 10c of the specimen 10. In FIG. 4, the same reference numerals are assigned to elements identical to those shown in FIGS. 1 and 2.

Only the light flux departing the specimen 10 from the thin layer 10a near the focal plane of the objective lens 16 is allowed to pass through the pinhole 19a' at the reflecting/transmitting surface 19a formed at the mask member 19.

Only the light flux departing the specimen 10 from the two layers enclosing the thin layer 10a on the upper and lower sides, i.e., the portion of the specimen corresponding to the thick layer 10b in FIG. 4 minus the thin layer 10a, is allowed to pass through the pinhole 19b' at the reflecting/transmitting surface 19b.

Only the light flux departing the specimen 10 from the two layers enclosing the thick layer 10b on the upper and lower sides, i.e., the portion of the specimen corresponding to the very thick layer 10c in FIG. 4 minus the thick layer 10b, is allowed to pass through the pinhole 19c' at the reflecting/transmitting surface 19c.

It is to be noted that the light flux departing the thick layer 10b is allowed to pass through the pinhole 19b' at the reflecting/transmitting surface 19b. However, since the light flux having departed the thin layer 10a has already passed through the pinhole 19a' at the reflecting/transmitting surface 19a, the light flux that has departed the portion of the thick layer 10b minus the thin layer 10a actually passes through the pinhole 19b'. Likewise, the light flux that actually passes through the pinhole 19c' at the reflecting/transmitting surface 19c is the light flux that departs the portion of the very thick layer 10c minus the thick layer 10b.

Thus, when the movable shutter 20 is in the first state Sa shown in FIG. 2A, i.e., when the optical path of the light flux from the pinhole 19a' alone is open, the thin layer 10a is the observation target. Accordingly, an image of the thin layer 10a is displayed at the monitor 23 as an image 100a in FIG. 4.

When the movable shutter 20 is in the second state Sb shown in FIG. 2A, i.e., when only the optical paths of the light fluxes from the pinholes 19a' and 19b' are open, the thick layer 10b is the observation target. Accordingly, an image of the thick layer 10b including the layer 10a is displayed at the monitor 23 as an image 100b in FIG. 4.

When the movable shutter 20 assumes the third state Sc shown in FIG. 2A, i.e., when the optical paths of the light fluxes from the pinholes 19a', 19b' and 19c' are all open, the very thick layer 10c is the observation target. Accordingly, an image of the very thick layer 10c including the layers 10a and 10b is displayed at the monitor 23 as an image 100c in FIG. 4.

As described above, the fluorescence confocal microscope system achieved in the first embodiment allows the sectioning resolution to be adjusted to provide the image 100a, 100b or 100c, simply as the user manually drives the movable shutter 20 or simply as the movable shutter 20 is electrically driven.

In the fluorescence confocal microscope system achieved in the first embodiment, the light flux representing the thin layer 10a, the light flux representing the thick layer 10b and the light flux representing the very thick layer 10c are all generated at the mask member 19.

The movable shutter 20 constituting the sole component that is driven when adjusting the sectioning resolution simply fulfills the function of opening/closing the light flux optical paths.

For this reason, the required level of accuracy is low with regard to the positioning of the movable shutter 20 and the drive mechanism for the movable shutter 20 is allowed to assume a simple structure.

In this manner, even when the positioning accuracy of the movable shutter 20 is low, highly accurate images of the various layers can be obtained as long as the mask member 19 has been positioned in advance with a high degree of accuracy.

Thus, while the fluorescence confocal microscope system in the first embodiment may assume a simple structure, it still allows the sectioning resolution to be adjusted with a high degree of accuracy.

Variations of the First Embodiment

In the fluorescence confocal microscope system achieved in the first embodiment, the reflecting surfaces 19A and 19B at the mask member 19 are used as a means for guiding the necessary light flux to the light detector 21. However, the present invention is not limited to this example, and a greater number of reflecting surfaces may be formed at the mask member 19 or an optical fiber with which light can be guided in any direction may be used instead of a reflecting surface. In such a case, a higher degree of freedom is afforded with regard to how the reflecting/transmitting surfaces 19a, 19b and 19c may be disposed at the mask member 19. However, the mask member 19 must be designed to ensure that the extent of loss of light quantity in the optical path is within an allowable range.

In addition, the movable shutter 20 does not need to be inserted substantially perpendicular to the individual light fluxes, as shown in FIG. 2A, and it may instead be inserted non-perpendicular to the individual light fluxes by, for instance, setting it parallel to the mask member 19.

Also, while the sectioning resolution is selected at one of the three settings in correspondence to the number of pinholes formed at the mask member 19 in the explanation provided above, the number of possible sectioning resolution settings may be greater than three or may be only two to meet specific needs. The number of reflecting/transmitting surfaces of 19a, 19b... should also be adjusted in correspondence to the number of pinholes formed at the mask member 19.

Figure 5:
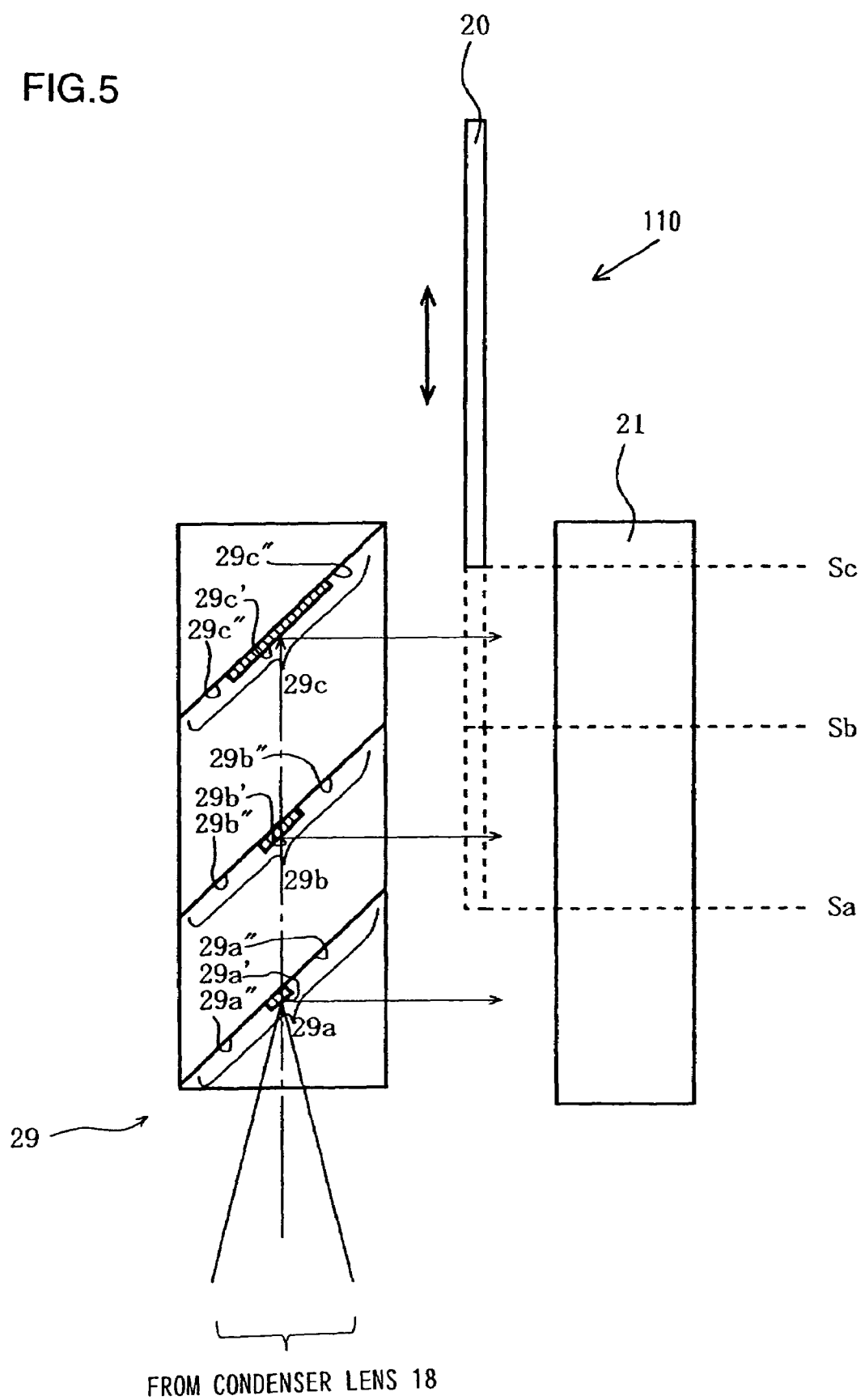
FIG. 5 illustrates a mask member achieved in a variation of the first embodiment.

In addition, instead of the light detection unit 1 shown in FIG. 1, a light detection unit 110 in FIG. 5 may be used. At a mask member 29 of the light detection unit 110 in FIG. 5, the reflecting surfaces and the transmitting surfaces are used by reversing the manner with which the reflecting surfaces and the transmitting surfaces are used at the mask member 19 of the light detection unit 1 in FIG. 1.

The following is an explanation of the light detection unit 110 shown in FIG. 5.

The mask member 29 in the light detection unit 110 includes a reflecting/transmitting surface 29a assuming an attitude that tilts the reflecting/transmitting surface 29a relative to a plane perpendicular to the optical axis within the focal depth of the condenser lens 18 shown in FIG. 1.

The reflecting/transmitting surface 29a is constituted with a reflecting surface 29a' assuming the shape of a very small circle near the optical axis of the condenser lens 18 and a transmitting surface 29a" covering the area surrounding the reflecting surface 29a'. The diameter ra of the reflecting surface 29a' is equivalent to the diameter of the spot formed on the specimen 10.

At this mask member 29, only the central portion of the light flux having entered from the condenser lens 18, which has entered at the position where the reflecting surface 29a' is formed, is reflected at the reflecting surface 29a' to exit the mask member 29, and the peripheral light flux other than the central light flux is transmitted through the transmitting surface 29a".

The mask member 29 further includes a reflecting/transmitting surface 29b for receiving the light flux transmitted through the transmitting surface 29a", which is disposed on the optical axis of light beam transmitted through the reflecting/transmitting surface 29a.

The reflecting/transmitting surface 29b is constituted with a round reflecting surface 29b' disposed in the vicinity of the center of the light flux having been transmitted through the transmitting surface 29a" and a transmitting surface 29b" that covers the area surrounding the reflecting surface 29b'. The diameter rb of the reflecting surface 29b' is greater than the diameter ra of the reflecting surface 29a' so as to achieve a relationship expressed as, for instance, rb=2ra.

At the mask member 29, only the central portion of the light flux having been transmitted through the transmitting surface 29a", which has entered at the position where the reflecting surface 29b' is formed, is reflected at the reflecting surface 29b' to exit the mask member 29, and the peripheral light flux other than the central light flux is transmitted through the transmitting surface 29b".

The mask member 29 further includes a reflecting/transmitting surface 29c for receiving the light flux transmitted through the transmitting surface 29b", which assumes an attitude identical to that of the reflecting/transmitting surface 29b. The reflecting/transmitting surface 29c is constituted with a round reflecting surface 29c' disposed in the vicinity of the center of the light flux having been transmitted through the transmitting surface 29b" and a transmitting surface 29c" that covers the area surrounding the reflecting surface 29c'. The diameter rc of the reflecting surface 29c' is greater than the diameter rb of the reflecting surface 29b' so as to achieve a relationship expressed as, for instance, rc=2rb.

At the mask member 29, only the central portion of the light flux having been transmitted through the transmitting surface 29b", which has entered at the position where the reflecting surface 29c' is formed, is reflected at the reflecting surface 29c' to exit the mask member 29.

Through this mask member 29, the central light flux and the peripheral light flux separated from each other at the reflecting/transmitting surfaces 29a and 29b are guided along the same direction, i.e., the direction towards the light detector 21.

It is to be noted that the mask member 29 may be formed by forming an optical film having a light reflecting property at appropriate areas of the transparent substrate. The optical film may be formed inside the transparent substrate, as shown in FIG. 5, by, for instance, cutting the transparent substrate into two blocks, forming the optical film over the section of one of the two blocks and then bonding the blocks to each other again.

It is to be noted that the distance between the reflecting/transmitting surface 29a and the reflecting/transmitting surface 29b and the distance between the reflecting/transmitting surface 29b and the reflecting/transmitting surface 29c are set small enough to position the reflecting/transmitting surface 29b and the reflecting/transmitting surface 29c within the focal depth of the condenser lens 18.

The detection surface at the light detector 21 has a large enough area to fully cover the optical path of the light flux from the reflecting surface 29a', the optical path of the light flux from the reflecting surface 29b' and the optical path of the light flux from the reflecting surface 29c' at the mask member 29 described above.

The movable shutter 20, which is driven in steps as indicated with the dotted line in FIG. 5, may be set to at least one of the following three states Sa, Sb and Sc in correspondence to the extent to which it is driven.

In the first state Sa, the optical path of the light flux from the reflecting surface 29a' is open, with the optical paths of the light fluxes from the reflecting surfaces 29b' and 29c' closed.

In the second state Sb, the optical paths of the light fluxes from the reflecting surfaces 29a' and 29b' are open, with the optical path of the light flux from the reflecting surface 29c' closed.

In the third state Sc, the optical paths of all the light fluxes from the reflecting surfaces 29a', 29b' and 29c' are open.

Second Embodiment

Figure 6:
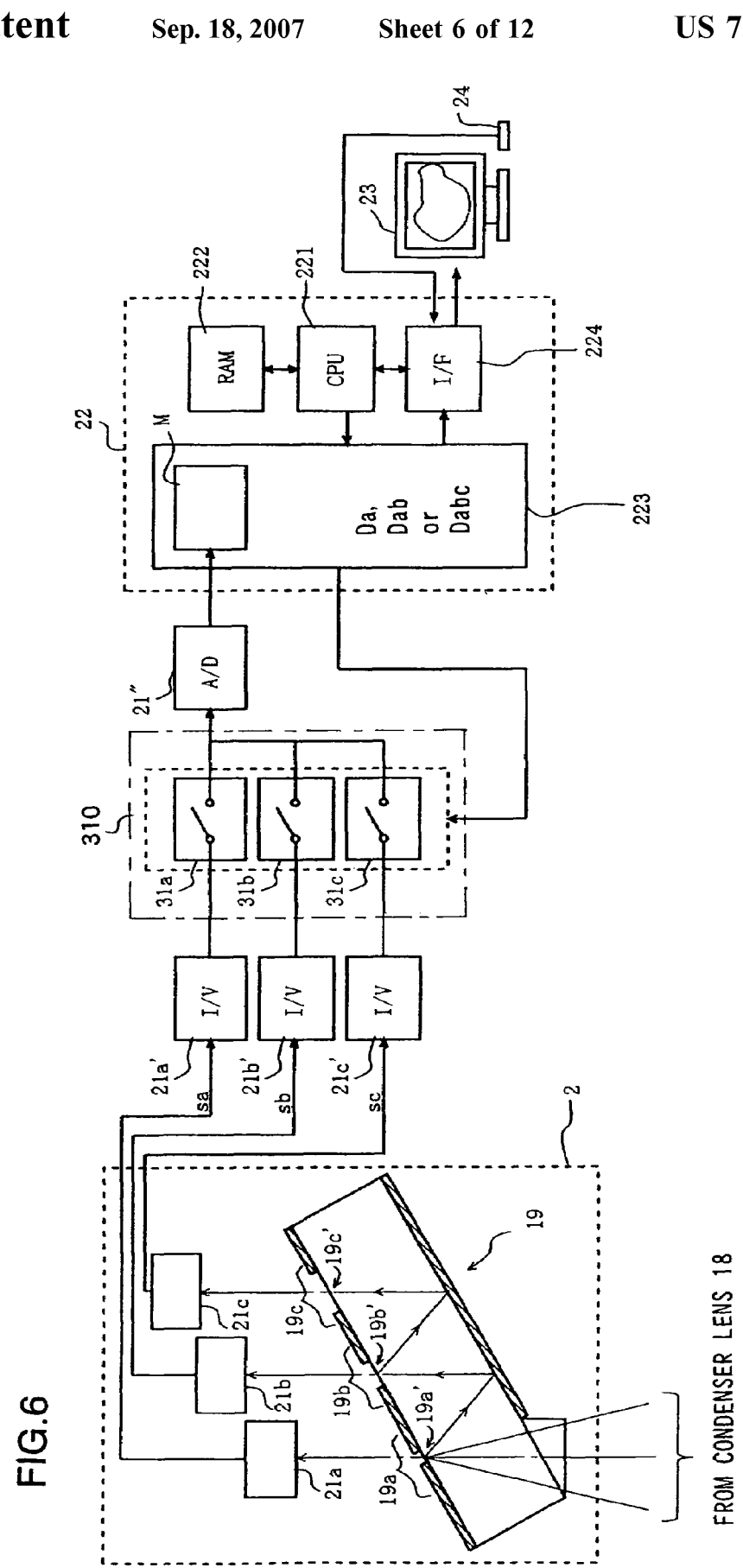
FIG. 6 shows the structure of a fluorescence confocal microscope system achieved in a second embodiment.

In reference to FIG. 6, the second embodiment of the present invention is explained. The explanation focuses on the features that differentiate the second embodiment from the first embodiment.

In the fluorescence confocal microscope system achieved in the second embodiment, a light detection unit 2 is constituted with an optical system which includes the mask member 19 and light detectors 21a, 21b and 21c, as shown in FIG. 6. Namely, the structure shown in FIG. 6 does not include the movable shutter 20 but includes the same number (three in this example) of light detectors 21a, 21b and 21c as the number of pinholes 19a', 19b' and 19c' formed at the mask member 19. In addition, the same number (three in this example) of switches 31a, 31b and 31c as the number of light detectors 21a, 21b and 21c are disposed between the light detectors 21a, 21b and 21c and the computer 22.

It is to be noted that a current/voltage converter (I/V) 21a' is inserted between the light detector 21a and the switch 31a, a current/voltage converter 21b' is inserted between the light detector 21b and the switch 31b, and a current/voltage converter 21c' is inserted between the light detector 21c and the switch 31c. In addition, an A/D converter (A/D) 21" is inserted between the switches 31a, 31b and 31c and the computer 22. The output of the A/D converter 21" is connected to an image board 223 within the computer 22. It is to be noted that although no current/voltage converter, A/D converter or the image board is included in the illustration provided in FIG. 1, the fluorescence confocal microscope system in FIG. 1 likewise includes these components. However, the fluorescence confocal microscope system in FIG. 1 only includes a single current/voltage converter.

The detection surface of the light detector 21a covers the optical path of the light flux from the pinhole 19a', the detection surface of the light detector 21b covers the optical path of the light flux from the pinhole 19b' and the detection surface of the light detector 21c covers the optical path of the light flux from the pinhole 19c'.

As a result, a signal sa indicating the quantity of the light flux departing the pinhole 19a' travels through the path extending from the light detector 21a to the A/D converter 21" sequentially via the current/voltage converter 21a' and the switch 31a.

A signal sb indicating the quantity of the light flux departing the pinhole 19b' travels through the path extending from the light detector 21b to the A/D converter 21" sequentially via the current/voltage converter 21b' and the switch 31b.

A signal sc indicating the quantity of the light flux departing the pinhole 19c' travels through the path extending from the light detector 21c to the A/D converter 21" sequentially via the current/voltage converter 21c' and the switch 31c.

The signals traveling through the separate paths undergo the selection process through operations of the individual switches 31a, 31b and 31c so as to be added together and the added signals are input to the A/D converter 21" before being input to the image board 223 at the computer 22. It is to be noted that a selecting/adding unit 310 which includes the switches 31a, 31b and 31c adds together the signals outputted from the switches 31a, 31b and 31c so as to input the combined signals to the A/D converter 21".

Signals input to the image board 223 are sequentially written into a frame memory M on the image board 223, and thus, image data of a single image are prepared in the frame memory M. A CPU 221 of the computer 22 displays the image at the monitor 23 by using the image data.

The CPU 221 in the computer 22 is connected to the switches 31a, 31b and 31c via the image board 223 and thus the CPU 221 is able to individually set the switches 31a, 31b and 31c in an open/closed state.

In addition, the user is allowed to specify a desired sectioning resolution setting among a plurality of settings, e.g., one of the three settings, high, medium and low, on the computer 22. The CPU 221, upon receiving via an interface circuit (I/F) 224 a signal input through the input device 24, recognizes the setting specified by the user.

In response to instructions issued by the CPU 221 in the computer 22, the fluorescence confocal microscope system achieved in the second embodiment engages in operation as described below.

If the setting specified in advance by the user is "high", the CPU 221 sets the switch 31a in a closed state and sets the switches 31b and 31c in an open state.

Since only the path of the signal Sa is open, only the signal sa is input to the A/D converter 21" under these circumstances. As a result, image data Da are prepared in the frame memory M by using the signal sa. Consequently, an image of the thin layer 10a such as the image 100a in FIG. 4 is displayed at the monitor 23.

If the setting specified in advance by the user is "medium", the CPU 221 sets the switches 31a and 31b in a closed state and sets the switch 31c in an open state.

Since the paths of the signal sa and the signal sb are open, the signals sa and sb are input to the A/D converter 21" under these circumstances. As a result, image data Dab are prepared in the frame memory M by using the signals sa and sb. Consequently, an image of the thick layer 10b, such as the image 100b in FIG. 4 is displayed at the monitor 23.

If the setting specified in advance by the user is "low", the CPU 221 sets all the switches 31a, 31b and 31c in a closed state.

Since the paths of the signal sa, the signal sb and the signal sc are all open, the signals sa, sb and sc are input to the A/D converter 21" under these circumstances. As a result, image data Dabc are prepared in the frame memory M by using the signals sa, sb and sc. Consequently, an image of the very thick layer 10c, such as the image 100c in FIG. 4 is displayed at the monitor 23.

The user of the fluorescence confocal microscope system achieved in the second embodiment only needs to operate the input device 24 to adjust the sectioning resolution at which the image 100a, 100b or 100c in FIG. 4 is to be displayed.

In the fluorescence confocal microscope system achieved in the second embodiment, the light flux representing the thin layer 10a, the light flux representing the thick layer 10b and the light flux representing the very thick layer 10c are all generated at the mask member 19.

In addition, only the computer 22 and the switches 31a, 31b and 31c need to be driven to adjust the sectioning resolution.

Thus, as long as the mask member 19 is positioned in advance with a high degree of accuracy, the images of the various layers can be obtained individually with a high degree of accuracy.

While the fluorescence confocal microscope system in the second embodiment, assumes a simple structure, it still allows the sectioning resolution to be adjusted with a high degree of accuracy.

Variations of the Second Embodiment

It is to be noted that the light detectors 21a, 21b and 21c do not need to be disposed substantially perpendicular to the corresponding light fluxes, as shown in FIG. 6, and they may instead be disposed non-perpendicular to the light fluxes by, for instance, setting them parallel to the mask member 19.

In addition, while the switches 31a, 31b and 31c used in the second embodiment are electrically opened/closed, i.e., opened/closed in correspondence to electrical instructions issued by the computer 22, switches 31a, 31b and 31c that are opened/closed manually may be used instead. In such a case, the user needs to open/close the switches 31a, 31b and 31c much the same way as that with which the CPU 221 opens/closes the switches as described above, instead of operating the input device 24.

Third Embodiment

Figure 7:
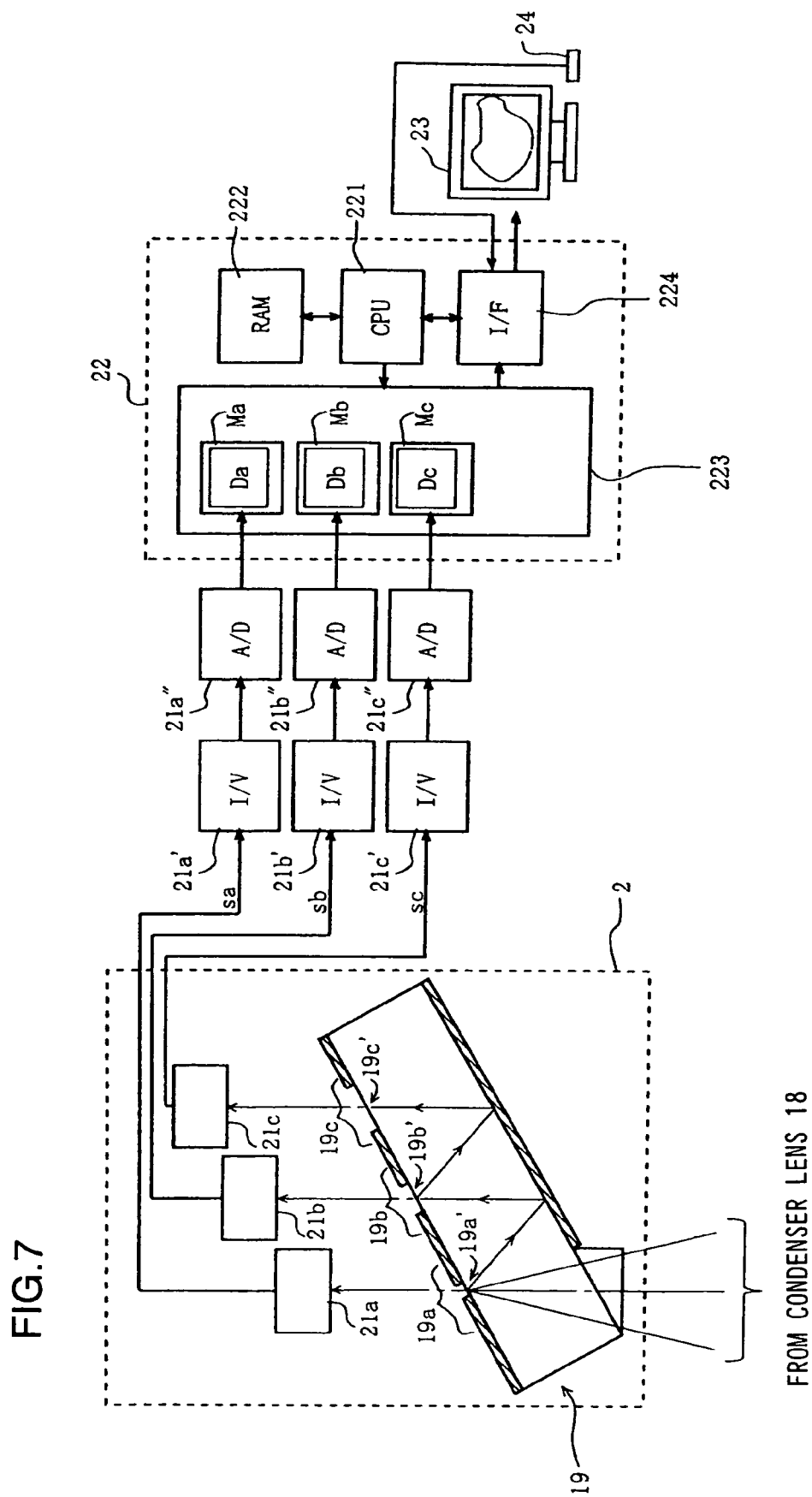
FIG. 7 shows the structure of a fluorescence confocal microscope system achieved in a third embodiment.

In reference to FIG. 7, the third embodiment of the present invention is explained.

The explanation focuses on the features that differentiate the third embodiment from the second embodiment.

As shown in FIG. 7, the fluorescence confocal microscope system achieved in the third embodiment does not include the switches 31a, 31b and 31c and, accordingly, the internal structure of the computer 22 is partially modified.

The image board 223 in the computer 22 includes a plurality of frame memories Ma, Mb and Mc in which signals sa, sb and sc output in parallel from the light detectors 21a, 21b and 21c respectively are stored in parallel. In addition, a plurality of A/D converters 21a", 21b" and 21c" are inserted in parallel to one another respectively at the paths of the signals sa, sb and sc.

The user is allowed to specify in advance the desired sectioning resolution setting from a plurality of settings, i.e., from the three settings, high, medium and low in this example, or to alter the sectioning resolution setting after an image is obtained on the computer 22. The CPU 221, upon receiving via the interface circuit (I/F) 224 a signal input through the input device 24, recognizes the setting specified by the user.

In response to instructions issued by the CPU 221 in the computer 21, the fluorescence confocal microscope system achieved in the third embodiment engages in operation as described below.

The signals sa, sb and sc output in parallel from the individual light detectors 21a, 21b and 21c are written in parallel into the frame memories Ma, Mb and Mc via the current/voltage converters 21a', 21b' and 21c' and the A/D converters 21a", 21b" and 21c", respectively.

As a result, image data Da are prepared by using the signal sa in the frame memory Ma, image data Db are prepared by using the signal sb in the frame memory Mb and image data Dc are prepared by using the signal sc in the frame memory Mc. These image data Da, Db and Dc are stored into a storage unit such as a RAM 222 in the computer 22.

If the setting having been specified by the user is "high", the CPU 221 reads out the image data Da from the RAM 222 and displays the image based upon the image data Da at the monitor 23. As a result, an image of the thin layer 10a, such the image 100a in FIG. 4 is displayed.

If the setting having been specified by the user is "medium", the CPU 221 reads out the image data Da and Db from the RAM 222, takes the sum of the image data Da and the image data Db, i.e., combines the image data Da and the image data Db and displays the image based upon the image data Dab constituting the sum of these data at the monitor 23. As a result, an image of the thick layer 10b, such as the image 100b in FIG. 4 is displayed.

If the setting having been specified by the user is "low", the CPU 221 reads out the image data Da, Db and Dc from the RAM 222, takes the sum of the image data Da, the image data Db and the image data Dc, i.e., combines the image data Da, the image data Db and the image data Dc and displays the image based upon the image data Dabc constituting the sum of these data at the monitor 23. As a result, an image of the very thick layer 10c, such as the image 100c in FIG. 4 is displayed.

The user of the fluorescence confocal microscope system achieved in the third embodiment only needs to operate the input device 24 to adjust the sectioning resolution at which the image 100a, 100b or 100c in FIG. 4 is to be displayed.

In the fluorescence confocal microscope system achieved in the third embodiment, the light flux representing the thin layer 10a, the light flux representing the thick layer 10b and the light flux representing the very thick layer 10c are all generated at the mask member 19. Only the computer 22 needs to be driven to adjust the sectioning resolution.

Thus, as long as the mask member 19 is positioned in advance with a high degree of accuracy, the images of the various layers can be obtained individually with a high degree of accuracy.

While the fluorescence confocal microscope system in the third embodiment assumes a simple structure, it still allows the sectioning resolution to be adjusted with a high degree of accuracy.

In addition, since the fluorescence confocal microscope system achieved in the third embodiment, which executes arithmetic operation at the CPU 221, for instance, which constitutes a calculation operation unit by using the image data obtained by employing a plurality of light detectors 21a, 21b and 21c, allows the sectioning resolution to be altered after an image is obtained and makes it possible to obtain image information corresponding to various layers, the sectioning resolution does not need to be specified prior to the image acquisition. As a result, the length of time required for selecting the settings for the image acquisition can be reduced. Furthermore, since the specimen does not have to be irradiated with light over an extended period of time, the extent of damage to the specimen can be reduced.

Moreover, since data of various images are obtained concurrently, the state of the specimen at a given time point can be observed at various sectioning resolution settings.

This feature is highly effective in an application in which a specimen (a living specimen) with its conditions constantly changing over time is observed at a given time point at varying sectioning resolution settings.

In addition, since the data of the individual images are stored independently of one another, the user is able to adjust the sectioning resolution as many times as necessary, whenever he desires.

Variation of the Third Embodiment

In the third embodiment, an explanation is given on an example where a single image of one of the layers of the specimen is displayed on the monitor 23, however, separate images of two or more layers may be shown simultaneously on the monitor 23.

EXAMPLES OF VARIATIONS

While the sectioning resolution is selected at one of the three settings in the explanation given in reference to the second and third embodiments, the number of possible sectioning resolution settings may be only two or may be three or more to meet specific needs. The number of reflecting/transmitting surfaces 19a, 19b. . . should also be adjusted in correspondence to the number of sectioning resolution settings.

In addition, one of the light detection units shown in FIGS. 8 through 12, for instance, may be used instead of the light detection unit 2 shown in FIG. 6 or 7 in conjunction with the fluorescence confocal microscope system in the second embodiment or the third embodiment. It is to be noted that in correspondence to the number of light detectors included in the specific light detection unit used in the microscope system, optimal numbers of current/voltage converters, switches, A/D converters and frame memories should be provided.

The following is an explanation of the various light detection units shown in FIGS. 8 through 12. It is to be noted that as in FIGS. 2 and 5, reference numerals assigned to the individual reflecting/transmitting surfaces are affixed with letters "a", "b" "c" . . . with "a" indicating the reflecting/ transmitting surface closest to the condenser lens 18, "b" indicating the reflecting/transmitting surface further away from the condenser lens 18, "c" indicating the reflecting/transmitting surface still further away from the condenser lens 18, etc., in these figures. In addition, the surface that affects the central light flux at each reflecting/transmitting surface is indicated by attaching an apostrophe (') to the reference numeral of the reflecting/transmitting surface and the surface that affects the peripheral light flux at the reflecting/transmitting surface is indicated by attaching a double apostrophe (") to the reference numeral of the reflecting/transmitting surface. The same letters "a", "b", "c", . . . as those affixed to the corresponding reflecting/transmitting surfaces are affixed to the reference numerals of the individual light detectors.

At each of the mask members shown in these figures, the diameter of the surface which affects the central light flux, i.e., the pinhole or the reflecting surface, is the greatest at the reflecting/transmitting surface furthest away from the condenser lens 18. The reflecting/transmitting surfaces are all disposed within the focal depth of the condenser lens 18.

Figure 8:
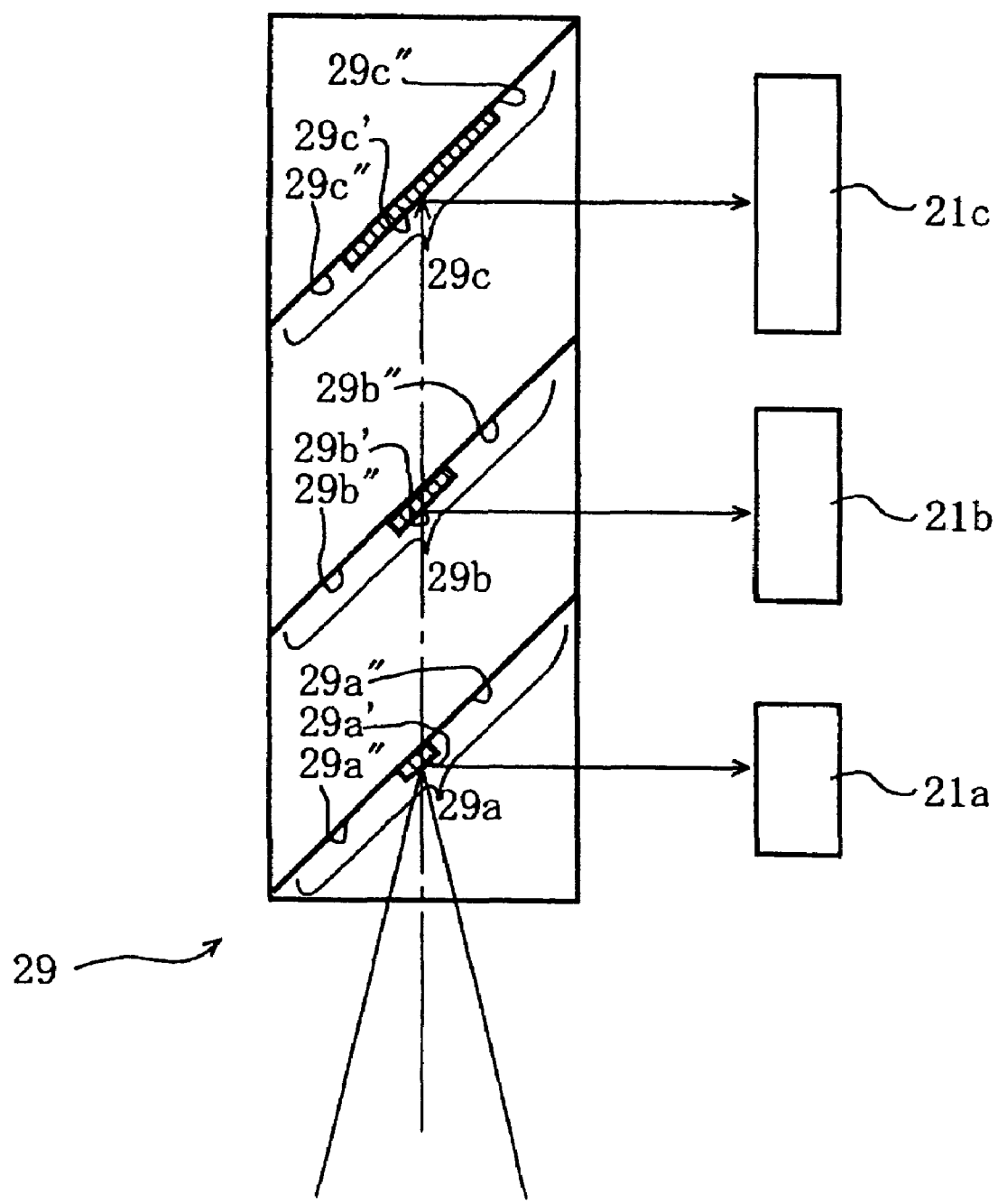
FIG. 8 presents another example of a light detection unit that may be adopted in the second embodiment or the third embodiment.

The mask member 29 of the light detection unit shown in FIG. 8 is identical to the mask member in FIG. 5. Namely, the reflecting surfaces 29a', 29b' and 29c' are formed at the centers of the reflecting/transmitting surfaces 29a, 29b and 29c and the transmitting surfaces 29a", 29b" and 29c" are formed so as to surround the central reflecting surfaces 29a', 29b' and 29c' respectively. The light detectors 21a, 21b and 21c are disposed so as to individually cover the optical paths of the light fluxes from the reflecting surfaces 29a', 29b' and 29c'.

Figure 9:
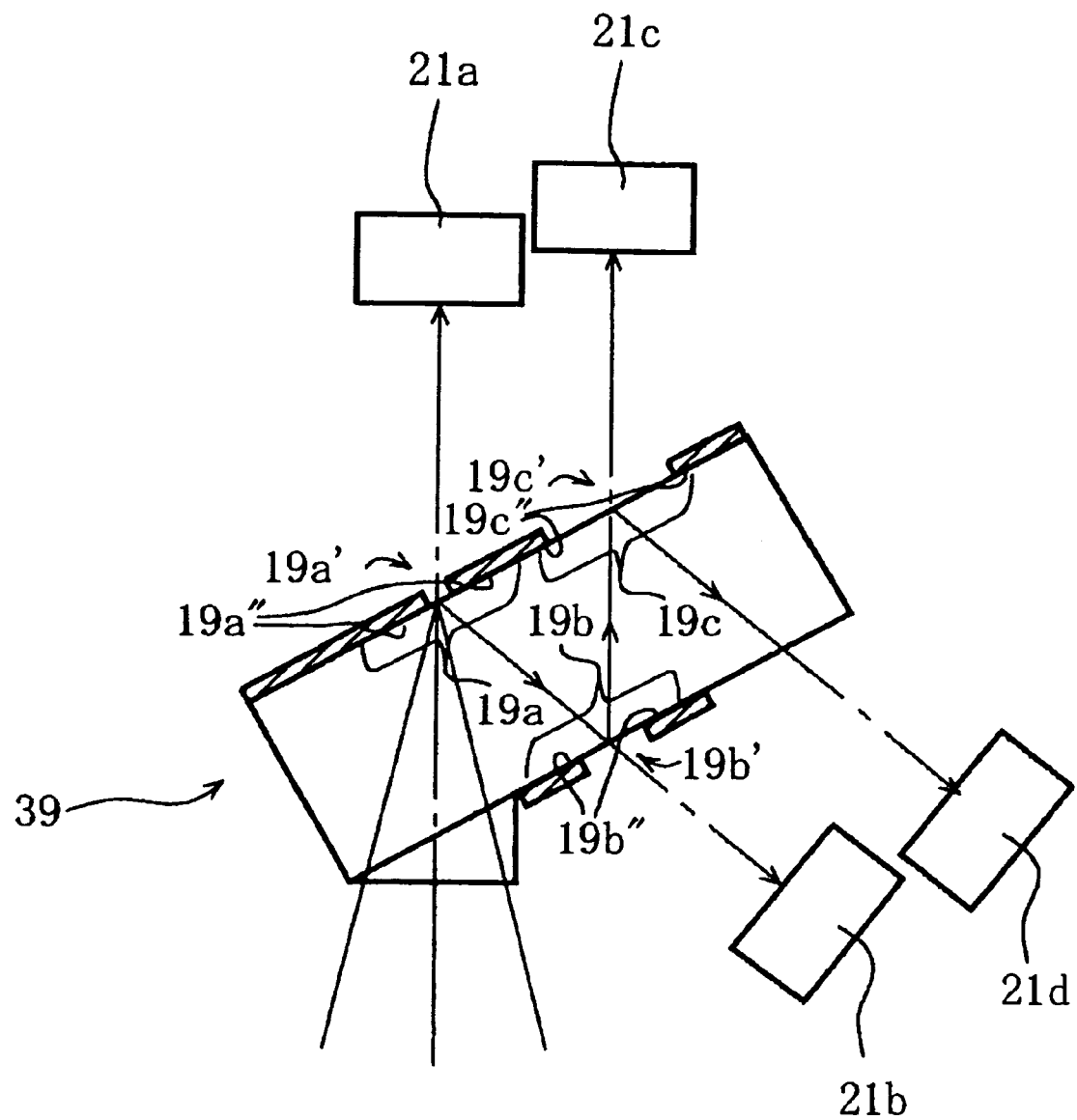
FIG. 9 presents yet another example of a light detection unit that may be adopted in the second embodiment or the third embodiment.

A mask member 39 on the light detection unit shown in FIG. 9 is achieved by modifying the mask member 19 in FIG. 2, with a reflecting/transmitting surface 19b disposed at the position assumed by the reflecting surface 19A in FIG. 2 and a reflecting/transmitting surface 19c disposed at the position assumed by the reflecting/transmitting surface 19b in FIG. 2. A light detector 21a covers the optical path of the light flux from the pinhole 19a', a light detector 21b covers the optical path of the light flux from the pinhole 19b', a light detector 21c covers the optical path of the light flux from the pinhole 19c', and a light detector 21d covers the optical path of the light flux from the surface which does not include a reflecting/transmitting surface.

Figure 10:
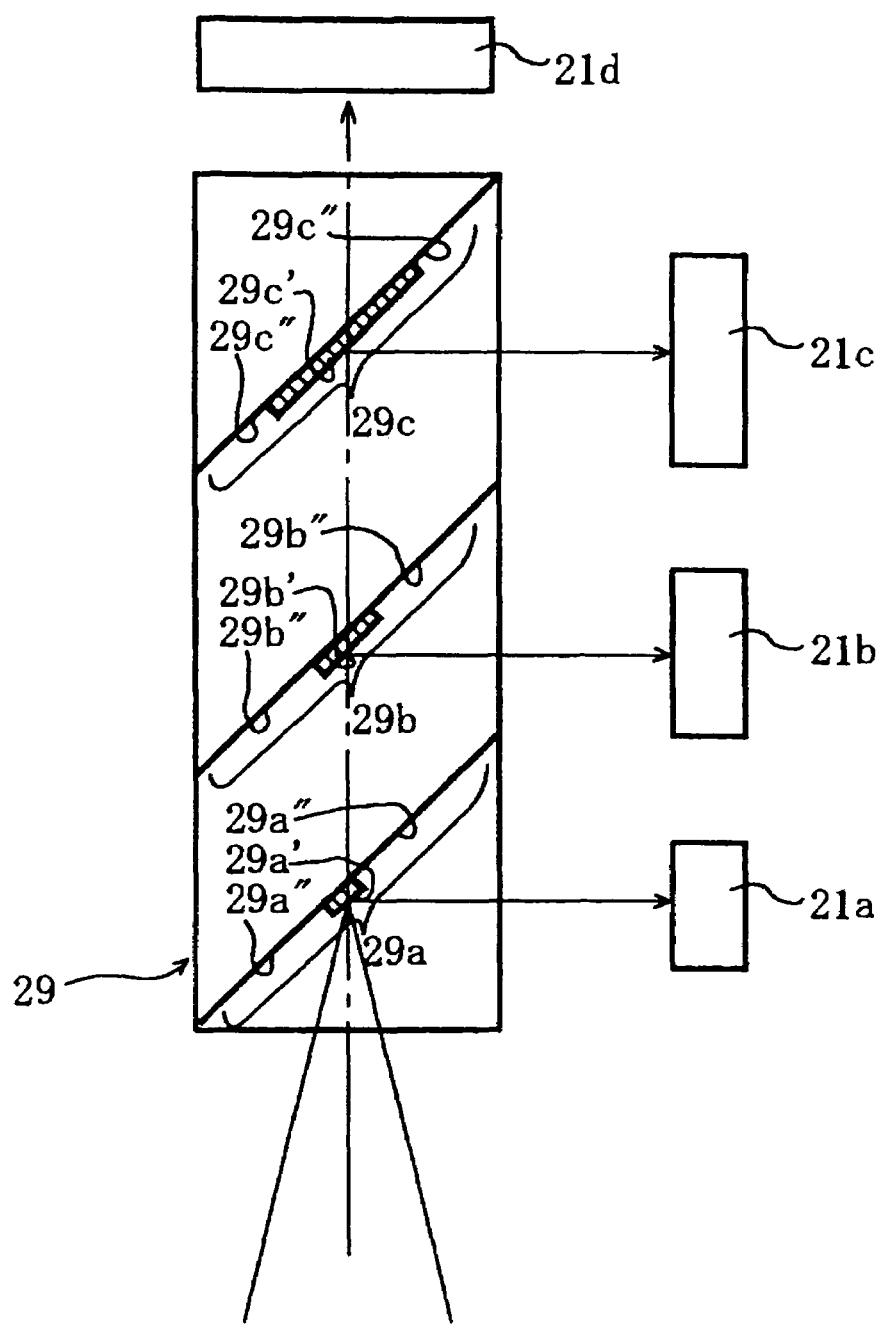
FIG. 10 presents yet another example of a light detection unit that may be adopted in the second embodiment or the third embodiment.

The mask member 29 in the light detection unit shown in FIG. 10 is similar to the mask member in FIG. 8, except that this light detection unit includes a light detector 21d. The light detector 21d covers the optical path of the light flux having been transmitted through the transmitting surface 29c" of the reflecting/transmitting surface 29c.

Figure 11:
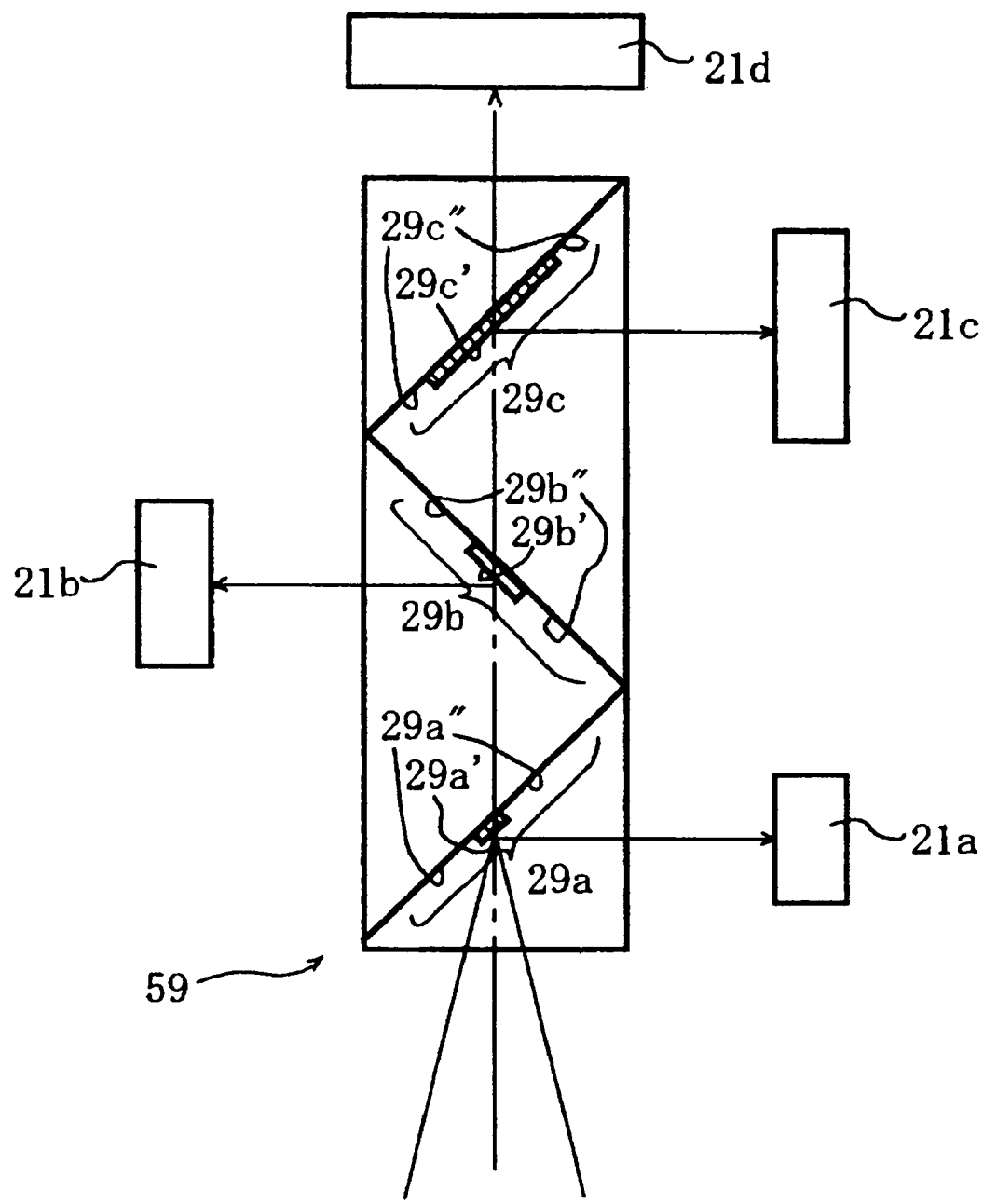
FIG. 11 presents yet another example of a light detection unit that may be adopted in the second embodiment or the third embodiment.

A mask member 59 in the light detection unit shown in FIG. 11 is achieved by modifying the mask member 29, with the reflecting/transmitting surface 29b, which is the second closest to the condenser lens 18, made to incline in the opposite direction from the direction along which the other reflecting/transmitting surfaces 29a and 29c incline. The light detector 21b covers the optical path of the light flux from the reflecting surface 29b' of this reflecting/transmitting surface 29b.

Figure 12:
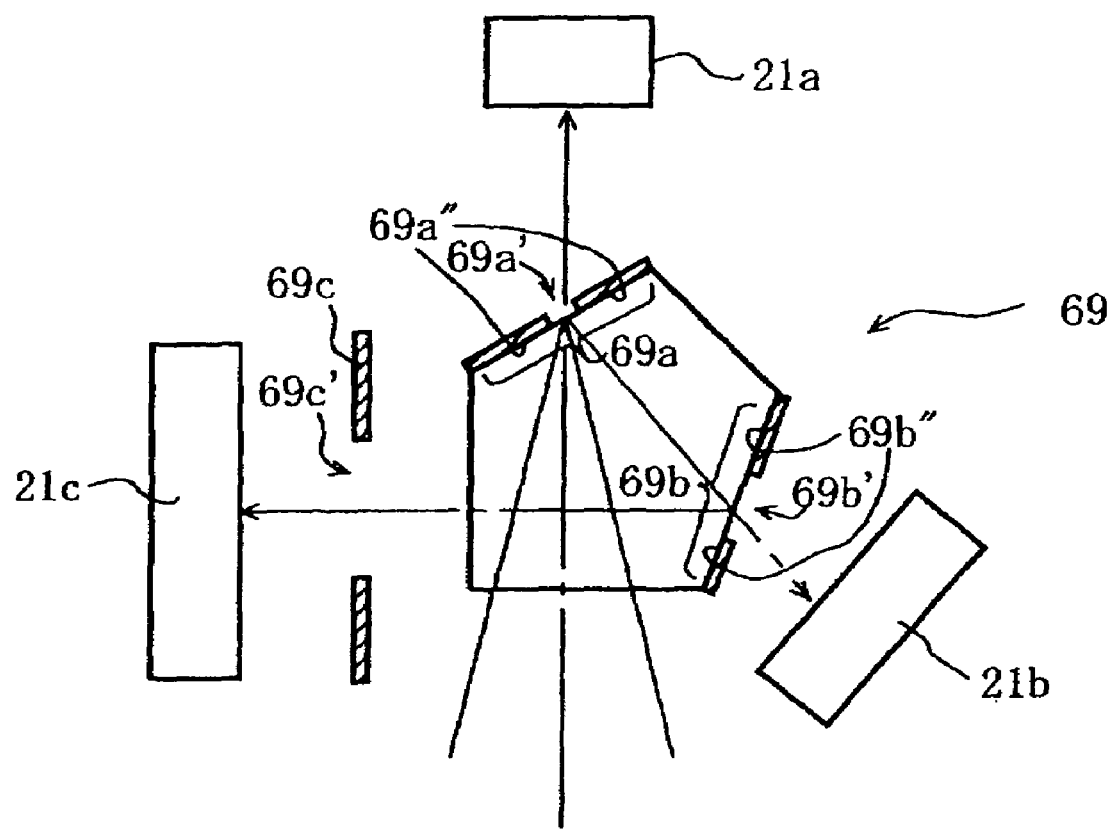
FIG. 12 presents yet another example of a light detection unit that may be adopted in the second embodiment or the third embodiment.

Unlike the other mask members each constituted by using a transparent substrate, a mask member 69 in the light detection unit shown in FIG. 12 is constituted by using a prism, e.g., a pentagonal prism.

The mask member 69 is constituted by forming: a reflecting/transmitting surface 69a that includes a pinhole 69a' and a reflecting surface 69a"; and a reflecting/transmitting surface 69b that includes a pinhole 69b' and a reflecting surface 69b" respectively at a second surface and a third surface of the pentagonal prism.

The light detector 21a covers the optical path of the light flux from the pinhole 69a', the light detector 21b covers the optical path of the light flux from the pinhole 69b' and the light detector 21c covers the optical path of the light flux from the last surface (the fifth surface) of the mask member 69 at which no reflecting/transmitting surface is formed.

It is to be noted that to the front of the light detector 21c, an aperture 69c having an opening 69c' which is larger than the opening of the pinholes 69a' or 69b' at the mask member 69 is disposed.

A similar aperture may be disposed between the mask member 39, 29 or 59 and the matching light detector in the corresponding light detection unit, i.e., the light detector 21d in FIG. 9, the light detector 29d in FIG. 10 or the light detector 21d in FIG. 11.

While the light reflected off the reflecting/transmitting surfaces 69a and 69b is led to the aperture 69c as shown in FIG. 12, the aperture 69c may instead be disposed at a position equivalent to the position of the reflecting/transmitting surface 69b so as to guide the light from the reflecting/transmitting surface 69a directly to the aperture 69c.

Moreover, the light separating members 19 and 39 explained in the first to third embodiments and as a variation example with reference to FIGS. 2A, 6, 7 and 9 may be modified in the similar manner. Namely, the reflecting/transmitting surface 19c which is arranged furthest along the reflected light path of the light separating members 19 and 39 may be replaced with an aperture, or an aperture may be disposed at a position where the light reflected off the reflecting/transmitting surface 19a which is the first reflecting/transmitting surface on the reflected light path enters.

While the present invention is adopted in a fluorescence confocal microscope system, i.e., in a confocal microscope system used for specimen observation under fluorescent light, in each of the first through third embodiments described above, the present invention may also be adopted with equal effectiveness in a confocal microscope system other than a fluorescence confocal microscope system.

As explained above, in the confocal microscope systems achieved in the first through third embodiments, the light flux that represents a relatively thin layer of the specimen and the light fluxes that represent the layers on the upper and lower sides of the thin layer are both generated at a single light separating member. As a result, the sectioning resolution can be adjusted through the operation of a detection means capable of selectively detecting these light fluxes or through the arithmetic operation executed on the signals corresponding to the individual light fluxes detected with various detectors.

Thus, the confocal microscope according to the present invention, while assuming a simple structure, allows the sectioning resolution to be adjusted with a high degree of accuracy.

The above described embodiments are examples, and various modifications can be made without departing from the spirit and scope of the invention.

What is claimed is:

1. A confocal microscope, comprising:
   a light source;
   an illuminating optical system that condenses light from the light source onto a specimen;
   an image forming optical system that forms an image with light from the specimen; and a detection unit that detects the light with which the image has been formed, wherein:

the detection unit comprises at least a light detector, and detects lights separated from each other, namely, light from a converging area at which the light is condensed on the specimen and light from an area on the specimen other than the converging area at a position substantially optically conjugate with the converging area via the image forming optical system.

2. A confocal microscope according to claim 1, wherein:

the detection unit has a light separating member that is disposed in the vicinity of a focal plane of the image forming optical system and separates the light from the specimen, with the light detector detecting the lights separated at the light separating member, wherein:

the light separating member comprises a light separating surface disposed within a focal depth of the image forming optical system and tilted relative to an optical axis of the image forming optical system, that separates the light from the specimen at a position substantially optically conjugate with the converging area into the light from the converging area and the light from the area other than the converging area.

3. A confocal microscope according to claim 2, wherein:
the light separating member comprises a plurality of light separating surfaces.

4. A confocal microscope according to claim 2, wherein:
the light separating surface comprises a circular transmitting surface through which the light from the converging area is transmitted and a reflecting surface at which the light from the area other than the converging area is reflected.

5. A confocal microscope according to claim 4, wherein:
the light separating member comprises a plurality of light separating surfaces disposed in series on a reflected light path of the light from the area other than the converging area, and among the plurality of the light separating surfaces, a diameter of the transmitting surface of the light separating surface disposed further with regard to a direction in which the reflected light path progresses is greater.

6. A confocal microscope according to claim 2, wherein:
the light separating surface comprises a circular reflecting surface at which the light from the converging area is reflected and a transmitting surface through which the light from the area other than the converging area is transmitted.

7. A confocal microscope according to claim 6, wherein:
the light separating member comprises a plurality of light separating surfaces disposed in series on a transmitted light path of the light from the area other than the converging area, and among the plurality of the light separating surfaces, a diameter of the reflecting surface of the light separating surface disposed further with regard to a direction in which the transmitted light path progresses is greater.

8. A confocal microscope according to claim 2, wherein:
the detection unit comprises a single detector that detects both the light from the converging area and the light from the area other than the converging area having been separated at the light separating surface and a movable shutter that blocks/admits one of the light from the converging area and the light from the area other than the converging area; and the light separating member guides the light from the converging area and the light from the area other than the converging area to the single detector.

9. A confocal microscope according to claim 8, wherein:
the detection unit detects a quantity of a sum of the light from the converging area and the light from the area other than the converging area or a quantity of the light from the converging area.

10. A confocal microscope according to claim 1, wherein:
the detection unit comprises a plurality of light detectors.

11. A confocal microscope according to claim 10, wherein:
the detection unit comprises at least a first detector that detects the light from the converging area and a second detector that detects the light from the area other than the converging area.

12. A confocal microscope system, comprising:
a confocal microscope according to claim 10, and
a selecting/adding unit that selects at least two signals to be added together among a plurality of detection signals detected at the plurality of light detectors.

13. A confocal microscope system, comprising:
a confocal microscope according to claim 10;
a storage unit that individually stores in memory a plurality of detection signals detected at the plurality of light detectors; and
a calculation operation unit that executes arithmetic operation on the detection signals stored in the storage unit.

* * * * *